(12) United States Patent
Ye et al.

(10) Patent No.: US 12,130,891 B2
(45) Date of Patent: Oct. 29, 2024

(54) METHOD OF LIVE VIDEO EVENT DETECTION BASED ON NATURAL LANGUAGE QUERIES, AND AN APPARATUS FOR THE SAME

(71) Applicant: SAMSUNG ELECTRONICS CO., LTD., Suwon-si (KR)

(72) Inventors: Ning Ye, Toronto (CA); Zhiming Hu, Toronto (CA); Caleb Ryan Phillips, Toronto (CA); Iqbal Ismail Mohomed, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 603 days.

(21) Appl. No.: 17/402,877

(22) Filed: Aug. 16, 2021

(65) Prior Publication Data

US 2022/0138489 A1 May 5, 2022

Related U.S. Application Data

(60) Provisional application No. 63/110,019, filed on Nov. 5, 2020.

(51) Int. Cl.
*G06F 18/22* (2023.01)
*G06F 16/732* (2019.01)
(Continued)

(52) U.S. Cl.
CPC .......... *G06F 18/22* (2023.01); *G06F 16/7343* (2019.01); *G06F 18/214* (2023.01);
(Continued)

(58) Field of Classification Search
CPC .... G06F 18/22; G06F 16/7343; G06F 18/214; G06V 20/46; G06V 20/44
See application file for complete search history.

(56) References Cited

U.S. PATENT DOCUMENTS

| | | | |
|---|---|---|---|
| 10,679,063 | B2 | 6/2020 | Cheng et al. |
| 10,963,504 | B2 | 3/2021 | Cheng et al. |

(Continued)

FOREIGN PATENT DOCUMENTS

| | | |
|---|---|---|
| CN | 109089133 A | 12/2018 |
| CN | 111726649 A | 9/2020 |
| KR | 10-2178490 B1 | 11/2020 |

OTHER PUBLICATIONS

International Search Report (PCT/ISA/210) and Written Opinion (PCT/ISA/237) dated Jan. 25, 2022 issued by the International Searching Authority in International Application No. PCT/KR2021/013484.

*Primary Examiner* — Margaret G Mastrodonato
(74) *Attorney, Agent, or Firm* — Sughrue Mion, PLLC

(57) ABSTRACT

A method of real-time video event detection includes: obtaining, based on a natural language query, a query vector; performing multimodal feature extraction on a video stream to obtain a video vector, obtaining a similarity score by comparing the query vector to the video vector; comparing the similarity score to a predetermined threshold; and activating, based on the similarity score being above the predetermined threshold, an action trigger. The multimodal feature extraction is performed using a plurality of overlapping windows that include sequential frames of the video stream.

17 Claims, 7 Drawing Sheets

(51) Int. Cl.
  *G06F 18/214* (2023.01)
  *G06N 20/00* (2019.01)
  *G06V 20/40* (2022.01)
(52) U.S. Cl.
  CPC .............. *G06N 20/00* (2019.01); *G06V 20/46* (2022.01); *G06V 20/44* (2022.01)

(56) References Cited

U.S. PATENT DOCUMENTS

| | | |
|---|---|---|
| 11,120,078 B2 | 9/2021 | Tang et al. |
| 2002/0009286 A1* | 1/2002 | Kasutani ............. G06F 16/7864 |
| | | 707/E17.028 |
| 2010/0063974 A1 | 3/2010 | Papadimitriou et al. |
| 2014/0270491 A1 | 9/2014 | Lu |
| 2016/0314818 A1 | 10/2016 | Kirk et al. |
| 2017/0061250 A1 | 3/2017 | Gao et al. |
| 2020/0089961 A1 | 3/2020 | Cho et al. |
| 2020/0097604 A1 | 3/2020 | Lee et al. |
| 2020/0394216 A1 | 12/2020 | Tang et al. |
| 2021/0200803 A1* | 7/2021 | Zhang ................. G06F 16/7844 |
| 2021/0319228 A1* | 10/2021 | Fleischman ............. G06F 18/22 |
| 2023/0297613 A1* | 9/2023 | Motohashi ............ G06F 16/738 |
| | | 707/769 |

* cited by examiner

METHOD OF LIVE VIDEO EVENT DETECTION BASED ON NATURAL LANGUAGE QUERIES, AND AN APPARATUS FOR THE SAME

CROSS-REFERENCE TO RELATED APPLICATION(S)

This application is based on and claims priority under 35 U.S.C. § 119 to U.S. Provisional Patent Application No. 63/110,019 filed on Nov. 5, 2020, in the U.S. Patent & Trademark Office, the disclosure of which is incorporated by reference herein in its entirety.

BACKGROUND

1. Field

The disclosure relates to video event detection, and more particularly to a method of detecting events in a live video stream based on natural language queries, and an apparatus for the same.

2. Description of Related Art

Video analytics at the edge is becoming an increasingly popular due to inherent benefits such as savings in bandwidth, potentially improved privacy by not having to offload from a private network, etc. The growth of video deployments on smart home devices leads to the emergence of a wide range of on-device applications. Home robots could be asked to survey the environment when the user is not home and automatically notify the user of intruders or misbehaving pets. AR glasses could help to track which step of a recipe the user is currently performing and inform the user of the subsequent steps. Such applications could benefit from an event triggering mechanism to detect the current state of the video feed in real time.

Deep learning-based multimodal representation learning has been used in the task of natural language-based text and video matching. However, these frameworks are optimized for accuracy and may be too computational expensive to deploy on an edge device.

SUMMARY

According to an aspect of the disclosure, a method of real-time video event detection includes obtaining, based on a natural language query, a query vector; performing multimodal feature extraction on a video stream to obtain a video vector, obtaining a similarity score by comparing the query vector to the video vector; comparing the similarity score to a predetermined threshold; and activating, based on the similarity score being above the predetermined threshold, an action trigger. The multimodal feature extraction is performed using a plurality of overlapping windows that include sequential frames of the video stream.

According to another aspect of the disclosure, an apparatus for real-time video event detection may include a memory storing one or more instructions; and at least one processor configured to execute the one or more instructions to; obtain, based on a natural language query, a query vector; perform multimodal feature extraction on a video stream to obtain a video vector, obtain a similarity score by comparing the query vector to the video vector; compare the similarity score to a predetermined threshold; and activate, based on the similarity score being above the predetermined threshold, an action trigger. The multimodal feature extraction may be performed using a plurality of overlapping windows that include sequential frames of the video stream.

According to yet another aspect of the disclosure, a non-transitory computer-readable medium may store instructions that, when executed by one or more processors, cause the one or more processors to: obtain, based on a natural language query, a query vector; perform multimodal feature extraction on a video stream to obtain a video vector, obtain a similarity score by comparing the query vector to the video vector; compare the similarity score to a predetermined threshold; and activate, based on the similarity score being above the predetermined threshold, an action trigger. The multimodal feature extraction is performed using a plurality of overlapping windows that include sequential frames of the video stream.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refer to the accompanying drawings. The same reference numbers in different drawings may identify the same or similar elements.

The foregoing disclosure provides illustration and description but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined n ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Figure 1:
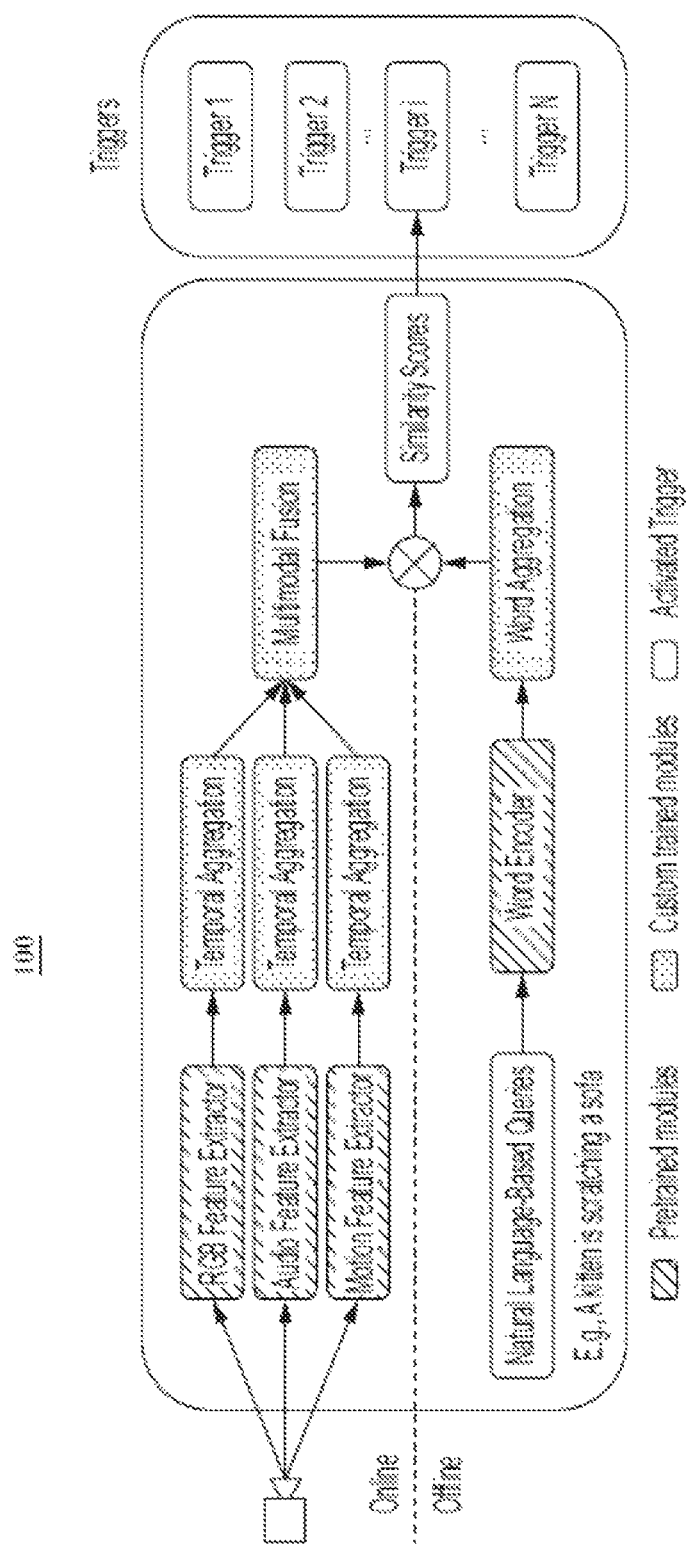
FIG. 1 is a diagram showing a general overview of a method for live video event detection based on natural language queries according to an embodiment.

FIG. 1 is a diagram showing a general over w of a method 100 for live video event detection based on natural language queries according to an embodiment. The method may be performed by an edge device having limited resources.

As shown in FIG. 1, the method may include operations performed offline as well as operations performed online. Operations performed online may be performed in real time or near real time based on a live video feed. Operations performed offline may be performed during a pervious time and the results may be stored on a device performing the method.

The offline component of the method 100 may include generating a vector based on a natural language query. The vector may be a complex mathematical representation of the words in the natural language query. A query vector may be generated for each of a plurality of queries that are inputted. According to an embodiment, the vector may be generated on the fly or in an online (or close to online) mode.

A natural language query such as "a kitten is scratching a sofa" may be input into the device. The natural language query may then be passed through a word encoder and word aggregator to generate a query vector that is mapped to an embedding space. The encoding and embedding may be performed based on techniques known in the art.

The online component may process an incoming video stream in real time (or near real time). The processing may include extracting features from the video stream using one or more feature extractors. According to an embodiment, the modalities of a multimodal feature extraction may include RGB feature extraction, audio feature extraction, and motion feature extraction. According to some embodiments, the multimodal feature extraction may include one or more of face detection, speech, and optical character recognition (OCR) modalities. However, disclosure is not limited to the listed example modalities.

The output of the features extractors may be input into respective temporal aggregation units that generate fixed sized vectors for each of the modalities. The fixed sized vectors from the multiple modalities may then be fused into a common video vector that is mapped to the embedding space.

A similarity score may be determined by comparing the query vector and the video vector which are both in the embedding space. According to an embodiment, the similarity score may be determined using cosine similarity.

The similarity score may be compared to a predetermined threshold. If the similarity score is above the threshold, an action trigger may be activated.

The method 100 may incorporate a dynamic sliding window technique in which the feature extractors analyze small clips (windows) of the video. Since different events may take place over different periods of time, a sliding window of a fixed size may not provide optimal results for detecting the events. As such, the window size may be dynamically adjusted to optimize event detection. For example, sub-video vectors based on different sized windows having a same start point may be compared to the query vector to obtain similarity scores for each of the window sizes. The vector corresponding to the window size having the highest similarity score may then be selected as the vector for determining if the event has been detected, thus resulting in an action trigger being activated.

The feature extractors used in the method 100 may be selected from among a group of available feature extractors based on the available resources of the device. According to an embodiment, the available resources for performing the method may be preset or dynamically determined based on system resources. Based on the available resources and a user specified latency constraint, the features extracted may be greedily selected. By greedily selecting the features extractors based on the available resources of the device performing the method 100, the method 100 may be optimized for a resource constrained edge device.

In some situations, the device performing the method 100 may not have sufficient resources to perform feature extraction for each available modality of the multimodal feature extraction framework. Accordingly, when training the multimodal model, one of the multiple modalities may be randomly masked to prevent the model from overfitting too quickly to a specific modality and to help the model learn more robust video representations. Masking a modality during training may include training the multimodal model without an input from the masked modality (turning off the masked modality). That is, during training, the multimodal model may receive inputs from all of the modalities except for the masked modality.

Figure 2:
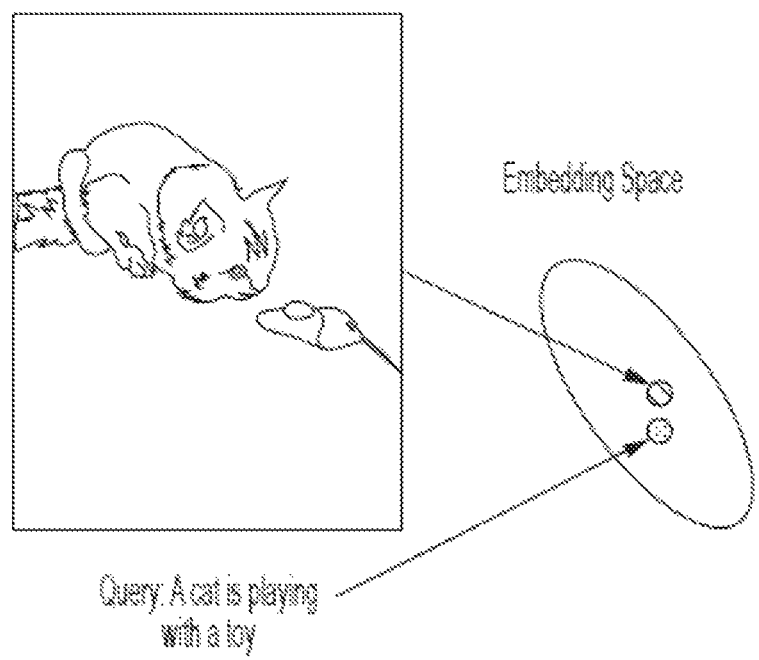
FIG. 2 is a diagram showing a relationship between information that is input into the method of event detection and an embedding space according to an embodiment.

FIG. 2 is a diagram showing a relationship between the information that is input into the method 100 and an embedding space according to an embodiment. As discussed above, word encoding, and word aggregation is performed on the input natural language query to generate a query vector that is mapped to the embedding space. As also discussed above, feature extraction, temporal aggregation, and multimodal fusion is performed on the input video stream to generate a video vector that is mapped to the embedding space. As shown in FIG. 2, by converting both inputs to vectors in the embedding space, the vectors can be readily compared t determine a similarity between the inputs. That is, the information from the inputs is converted into comparable data in common space.

Figure 3:
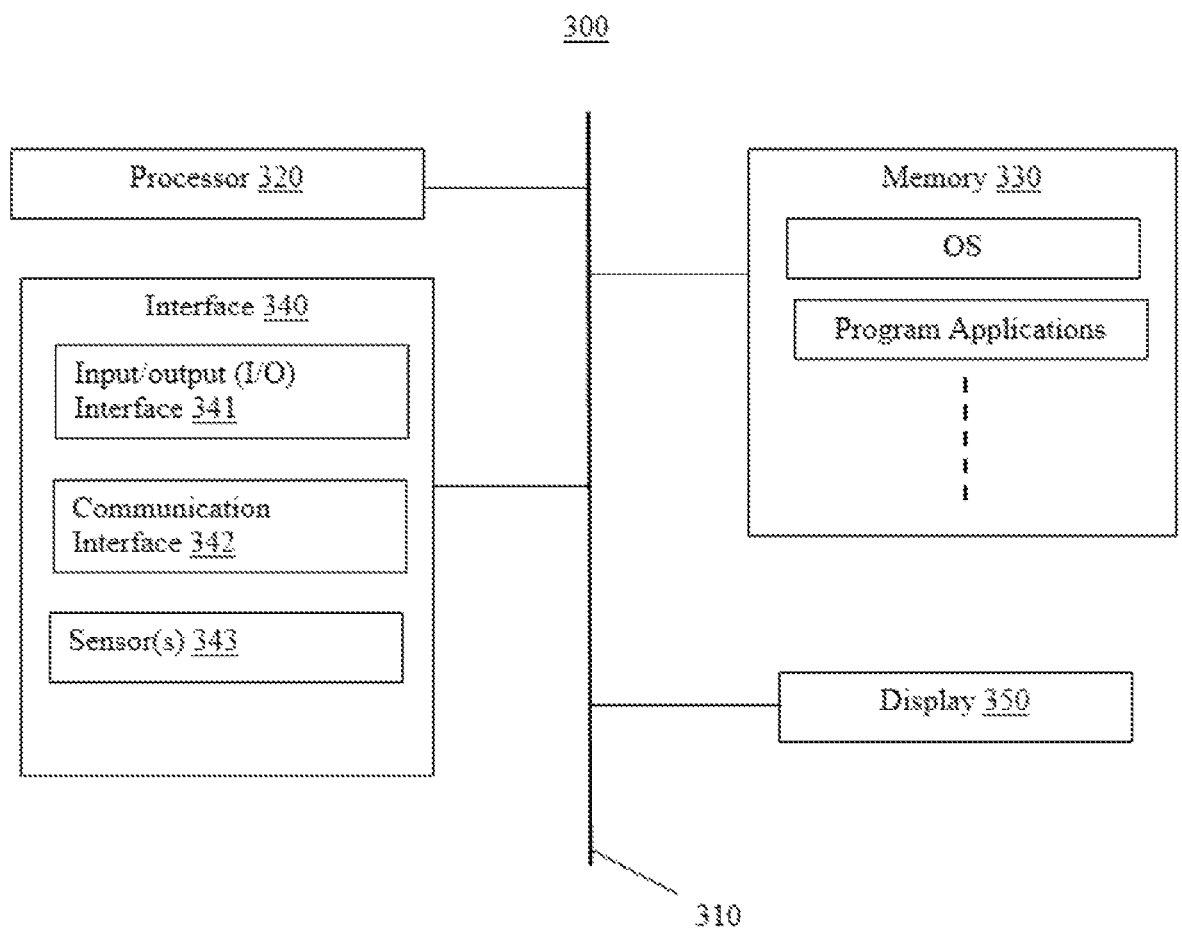
FIG. 3 diagram of an electronic device for performing the event detection method according to an embodiment.
Figure 4:
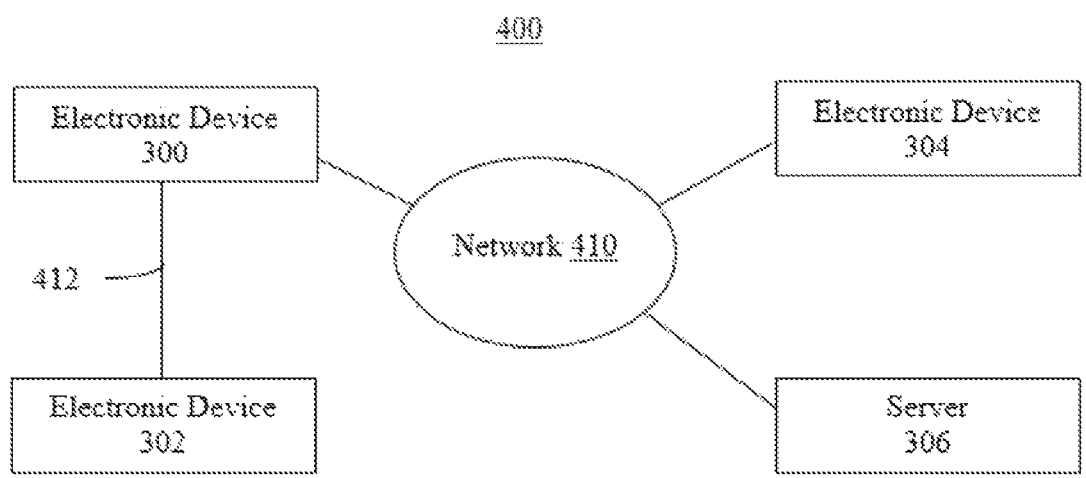
FIG. 4 is a diagram of a network environment for performing the event detection method according to an embodiment.

The event detection method may be performed by electronic device 300 of FIG. 3, in a network environment 400 as shown in FIG. 4, according to an embodiment. FIGS. 3 and 4 are for illustration only, and other embodiments of the electronic device and ne work could be used without departing from the scope of this disclosure.

As shown in FIG. 3 electronic device 300 includes at least one of a bus 310, a processor 320 (or a plurality of processors), a memory 330, an interface 340, or a display 350.

Bus 310 may include a circuit for connecting the components 320, 330, 340, and 350 with one another. Bus 310 may function as a communication system for transferring data between the components, or between electronic devices.

Processor 320 may include one or more of a central processing unit (CPU), a graphics processor unit (GPU), an accelerated processing unit (APU), many integrated core (MIC), a field-programmable gate array (FPGA), or a digital signal processing (DSP). Processor 320 may control at least one of the other components of electronic device 300, and/or perform an operation or data processing relating to communication. Processor 320 may execute one or more programs stored in memory 330.

Memory 330 may include a volatile and/or a non-volatile memory. Memory 330 may store information, such as one or more commands, data, programs (one or more instructions), or applications, etc., that is related to at least one other component of the electronic device 300 and for driving and controlling electronic device 300. For example, commands or data may formulate an operating system (OS). Information stored in memory 330 may be executed by processor 320.

The application may include one or more embodiments as discussed above. These functions can be performed by a single application or by multiple applications that each carry out one or more of these functions.

Display 350 may include, for example, a liquid crystal display LCD) a light emitting diode (LED) display, an organic light emitting diode (OLED) display, a quantum-dot light emitting diode (QLED) display, a microelectromechanical systems (MEMS) display, or an electronic paper display. Display 350 can also be a depth-aware display, such as a multi-focal display. Display 350 can present, for example, various contents (such as text, images, videos, icons, or symbols).

Interface 340 may include input/output (I/O) interface 341, communication interface 342, and/or one or more sensors 343, I/O interface 341 serves as an interface that can, for example, transfer commands or data between a user or other external devices and other component(s) of electronic device 300.

Sensor(s) 343 may meter a physical quantity or detect an activation state of electronic device 300 and may convert metered or detected information into an electrical signal. For example, sensor(s) 343 may include one or more cameras or other imaging sensors for capturing images of scenes. The sensor(s) 343 may also include a microphone, a keyboard, a mouse, one or more buttons for touch input, a gyroscope or gyro sensor, an air pressure sensor, a magnetic sensor or magnetometer, an acceleration sensor or accelerometer, a grip sensor, a proximity sensor, a color sensor (such as a RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (EGG) sensor, air infrared (IR) sensor, an ultrasound sensor, an iris sensor, or a fingerprint sensor. The sensor(s) 343 can further include an inertial measurement unit. In addition, sensor(s) 343 can include a control circuit for controlling at least one of the sensors included here. Any of these sensor(s) 343 can be located within or coupled to electronic device 300. Sensor(s) 343 may be used to detect touch input, gesture input, hovering input using an electronic pen or a body portion of a user, etc.

Figure 6:
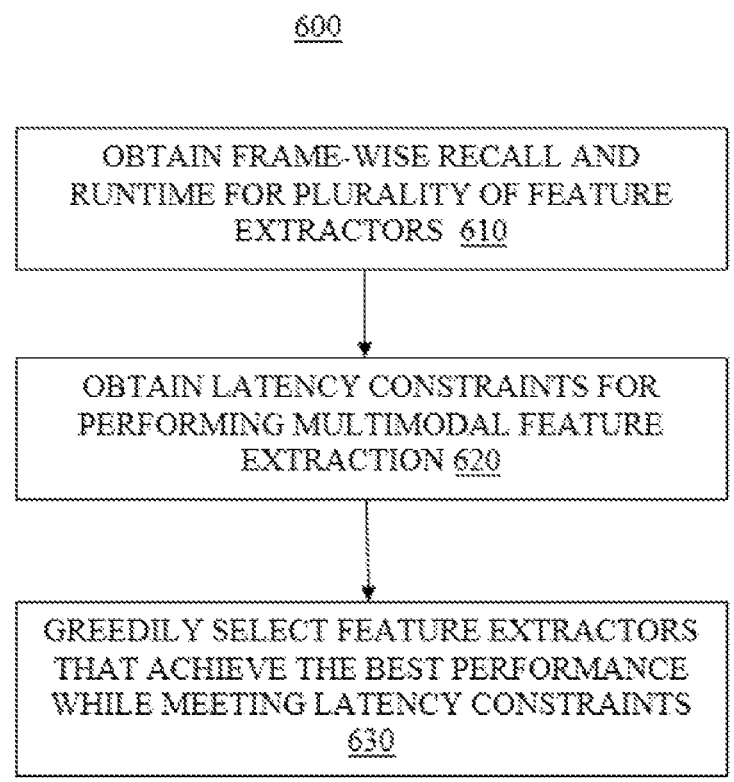
FIG. 6 is a flowchart of a method of selecting feature extractors based on the constraints of the device performing the event detection method according to an embodiment.

Communication interface 342, for example, may be able to set up communication between electronic device 300 and an external electronic device (such as a first electronic device 302, a second electronic device 304, or a server 306 as shown in FIG. 6). As shown in FIG. 4, communication interface 342 may be connected with a network 410 and/or 412 through wireless or wired communication architecture to communicate with an external electronic device. Communication interface 342 may be a wired or wireless transceiver or any other component for transmitting and receiving signals.

FIG. 4 shows an example network configuration 400 according to an embodiment. Electronic device 300 of FIG. 3 may be connected with a first external electronic device 302, a second external electronic device 304, or a server 306 through network 410 and/or 412. Electronic device 300 may be a wearable device, an electronic device-mountable wearable device (such as an FIMD), etc. When electronic device 300 is mounted in the electronic device 302 (such as the FIMD), electronic device 300 may communicate with electronic device 302 through communication interface 342. Electronic device 300 may be directly connected with electronic device 302 to communicate with electronic device 302 without it involving a separate network. Electronic device 300 may also be an augmented reality wearable device, such as eyeglasses, that include one or more cameras.

The first and second external electronic devices 302 and 304 and server 306 may each be a device of a same or a different type than electronic device 300. According to some embodiments, server 306 may include a group of one or more servers. Also, according to some embodiments, all or some of the operations executed on electronic device 300 may be executed on another or multiple other electronic devices (such as electronic devices 302 and 304 or server 306). Further, according to some embodiments, when electronic device 300 should perform some function or service automatically or at a request, electronic device 300, instead of executing the function or service on its own or additionally, can request another device (such as electronic devices 302 and 304 or server 306) to perform at least some functions associated therewith. The other electronic device (such as electronic devices 302 and 304 or server 306) may be able to execute the requested functions or additional functions and transfer a result of the execution to electronic device 300. Electronic device 300 can provide a requested function or service by processing the received result as it is or additionally. To that end, a cloud computing, distributed computing, or client-server computing technique may be used, for example. While FIGS. 3 and 4 show that electronic device 300 including communication interface 342 to communicate with external electronic devices 302 and 304 or server 306 via the network 410 or 412, electronic device 300 may be independently operated without a separate communication function according to some embodiments.

Server 306 may include the same or similar components 310, 320, 330, 340, and 350 as electronic device 300 (or a suitable subset thereof). Server 306 may support driving electronic device 300 by performing at least one of the operations (or functions) implemented on electronic device 300. For example, server 306 can include a processing module or processor that may support processor 320 of electronic device 300.

The wireless communication may be able to use at least one of, for example, long term evolution (LTE), long term evolution-advanced (LTE-A), 5th generation wireless system (5G), millimeter-wave or 60 GFIz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection may include, for example, at least one of a universal serial bus (USB), high-definition multimedia interface (HDMI), recommended standard 232 (RS-232), or plain old telephone service (POTS). The network 410 or 412 includes at least one communication network, such as a computer network (like a local area network (LAN) or wide area network (WAN)), Internet, or a telephone network.

Although FIG. 4 shows one example of a network configuration 400 including an electronic device 300, two external electronic devices 302 and 304, and a server 306, various changes may be made to FIG. 4. For example, the network configuration 400 could include any number of each component in any suitable arrangement. In general, computing and communication systems come in a wide variety of configurations, and FIG. 3 does not limit the scope of this disclosure to any particular configuration. Also, while FIG. 3 shows one operational environment in which various features disclosed in this patent document can be used, these features could be used in any other suitable system.

The event detection method may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 300 but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The event detection method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of server 306.

Figure 5:
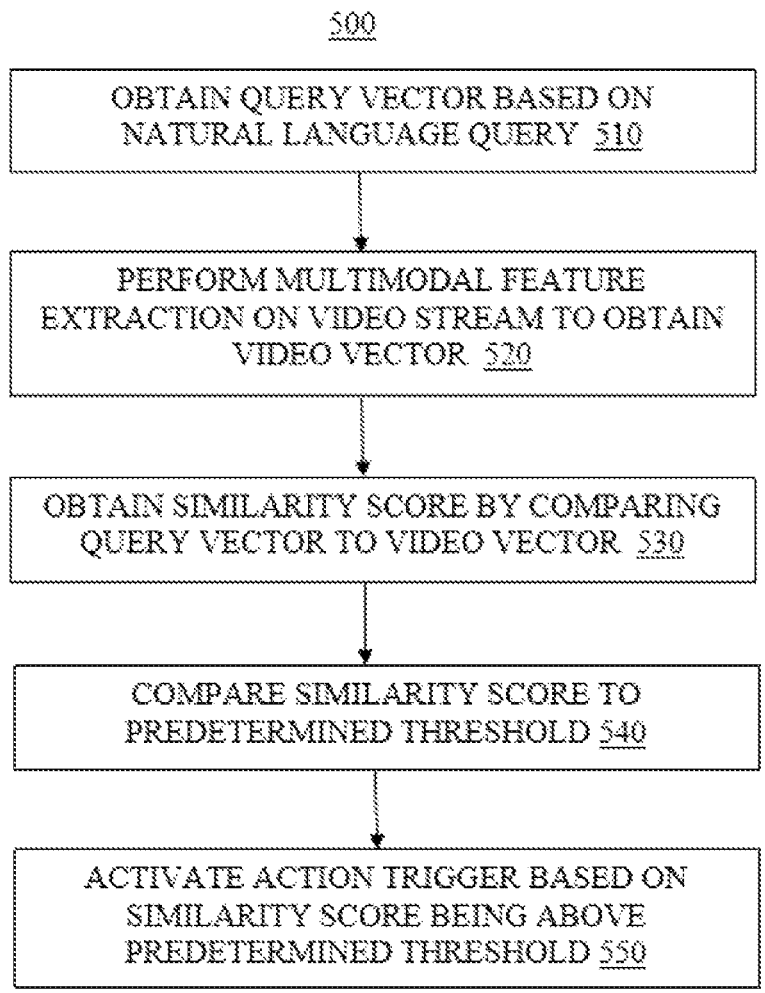
FIG. 5 is a flowchart of a method of event detection according to an embodiment.

FIG. 5 is a flowchart of a method 500 of event detection according to an embodiment.

At operation 510, a query vector based on a natural language query may be obtained. The query vector may be generated by a device performing the event detection or may be performed by another device that transmits the query vector to the device performing the event detection. The natural language query may be input as text by a user or may be input as voice by a user which is then converted to text using known methods. According to an embodiment, a plurality of query vectors may be obtained based on a plurality of queries.

According to an embodiment, a user may type a natural language query into the device performing the event detection. The natural language text may be encoded by a word encoder, and then a word aggregator may generate a query vector that is mapped to an embedding space based on the encoded natural language text.

At operation 520, multimodal feature extraction may be performed on a video stream to generate a video vector. The multimodal feature extraction may be performed in real time or near real time to provide real time processing of a live video stream.

According to an embodiment, features may be extracted based on one or more of RGB, audio, motion, face detection, speech, and optical character recognition (OCR) modalities. The output of each feature extractor may be converted into fixed sized vectors using temporal aggregation. The fixed sized vectors may be combined into a single video vector (or sub-video vector) in embedding space using multimodal fusion.

The multimodal feature extraction may implement a buffering approach to analyze small clips of a video at a time which enables temporal correlation to be exploited to better detect actions and events spanning a collection of frames. According to an embodiment, the multimodal feature extraction may implement a dynamic sliding window technique that selects an optimal window size based on a video-query similarity. The dynamic sliding window technique may use set of variable window sizes w $\in$ {16, 32, 48, 64, 80} to obtain a set of similarity scores $S_w^q$ starting from frame f. Here, $S_w^q$ is the similarity score between a vector representing the q-th query and a vector representing a window of frames with a w-th window size. The window size ($\mathrm{argmax}_w \mathrm{max}_q S_w^q$) that yields the highest score may be chosen as the current window for the video-query matching. The process may repeat itself with the (f+w)-th frame as the next starting point. As such, each frame is only processed once and the only additional computation stems from the multimodal fusion.

For example, frames 1 through 80 of the video stream may be processed by the feature extractors. A first sub-video vector in the embedding space may be generated for frames 1-16, a second sub-video vector in the embedding space may be generated for frames 1-32, a third sub-video vector in the embedding space may be generated for frames 1-48, a fourth sub-video vector in the embedding space may be generated for frames 1-64, and a fifth sub-video vector in the embedding space may be generated for frames 1-80. Each of the sub-video vectors may be compared to a query vector, and the sub-video vector having the highest similarity score may be selected as the video vector for determining whether an action trigger is activated.

If the second sub-video vector has the highest similarity score when compared to the query vector, a second set of sub-video vectors will be generated starting at frame 33 and the sub-video vector from the second set having the highest score will be selected as a video vector for comparing with a query vector to determine whether an action trigger is activated. This process may be repeated throughout the entire video stream. According to some embodiments, the sub-video vectors may be compared to multiple query vectors, and the highest similarity score from the comparison with all of the multiple query vectors may be selected as the video vector for determining whether an action trigger is activated.

At operation 530, a similarity score may be obtained between the video vector and the query vector. According to an embodiment, the similarity score may be determined using cosine similarity, but the disclosure is not limited to this method of determining a similarity score. According to some embodiments, multiple similarity scores may be obtained between each selected video vector based on comparisons with multiple query vectors corresponding to different natural language queries.

At operation 540, the similarity score may be compared to a predetermined threshold. According to an embodiment, the predetermined threshold may be selected by a user based on desired sensitivity of the event detection.

At operation 550, an action trigger may be activated based on the similarity score being above the predetermined threshold. The action trigger may be specific to the query. For example, a query of "a dog sitting on a couch" may trigger an alarm to scare the dog from the couch, and a query of "a package is delivered" may trigger a recording of the video feed for package security.

FIG. 6 is a flowchart of a method 600 of selecting feature extractors based on the constraints of the device performing the event detection method according to an embodiment.

At operation 610, profiling information indicating framewise recall and runtime for a plurality of available feature extractors may be obtained. According to an embodiment, the profiling information may be determined offline at a design time based on the hardware of the device performing the event detection operation 700. According to another embodiments, the profiling information may be determined dynamically near runtime of the event detection method to account for the conditions. According to other embodiments, the profiling information may be determined based on a sample of the video stream and may be repeated multiple times throughout an event detection operation to account for changes in the environment.

At operation 620, latency constraints for performing the multimodal feature extraction may be obtained. According to an embodiment, the latency constraints may be selected by a user, but the disclosure is not limited to this embodiment.

At operation 630, the method 600 may greedily select feature extractors that achieve the best performance while meeting latency requirement. The greedy selection process will be explained below based on the example profiling information provided in Table 1.

TABLE 1

| Modality | Model   | Recall (%) | CPU Runtime (ms) |
|----------|---------|------------|------------------|
| RGB      | Model 1 | 63.21      | 31               |
| RGB      | Model 2 | 60.28      | 14               |
| RGB      | Model 3 | 65.06      | 122              |
| Motion   | Model 4 | 60.06      | 71               |
| Motion   | Model 5 | 72.87      | 200              |
| Motion   | Model 6 | 70.96      | 89               |
| Audio    | Model 7 | 38.76      | 12               |

The above table is provided as an example and is not intended to be limiting.

The following will discuss an embodiment of an algorithm greedily selecting feature extractors based on a 150 ms latency constraint. The algorithm may select feature extractors having the best accuracy runtime tradeoff.

The process may first consider the feature extractor providing the best recall percentage. Model 5 provides the highest recall of 72.87%, but will not be selected because the 200 ms runtime is higher than the 150 ms latency constraint. The algorithm may then look at Model 6 which provides 70.96 percent recall with a runtime of 89 ms. Since 89 ms is within the 150 ms constraint, Model 6 is selected. The algorithm may then move to Model 3 which provides 65.06 percent recall at a runtime of 122 ms. Since the combination of 122 ms and 89 ms (from the selected Model 6) is above 150 ms, Model 3 will not be selected. The algorithm may then consider Model 1 which provides a 63.21 recall percentage at a runtime of 31 ms. Since the combination of 31 ms and 89 ms (120 ms) is less than 150 ms, Model 1 is selected.

Redundancy may be reduced by selecting only one model from each modality. Accordingly, Model 2, which provides a 60.28 recall percentage with a runtime of 14 ms may not be selected because Model 1 from the RGB modality has already been selected.

The above process based on the example algorithm may be continued until no more feature extractors can be fit into the latency constraint. The event detection method 500 may then be run based on the feature extractors selected in the selection method 600.

The multimodal feature extraction may be performed by a deep learning based model. As discussed above, due to the constraints of the device performing the method of event detection (edge device), some models and/or modalities may not be present at inference time. To imitate the occurrence of missing models and/or modalities, one or more random experts may be masked for a particular sample during training of the multimodal model. That is, the features for the one or more models will not be computed nor passed into the multimodal model during training, which is representative of cases where one or more models are absent during inference time. This prevents the multimodal model from overfitting too quickly to a specific expert and helps it learn more robust video representations.

Figure 7:
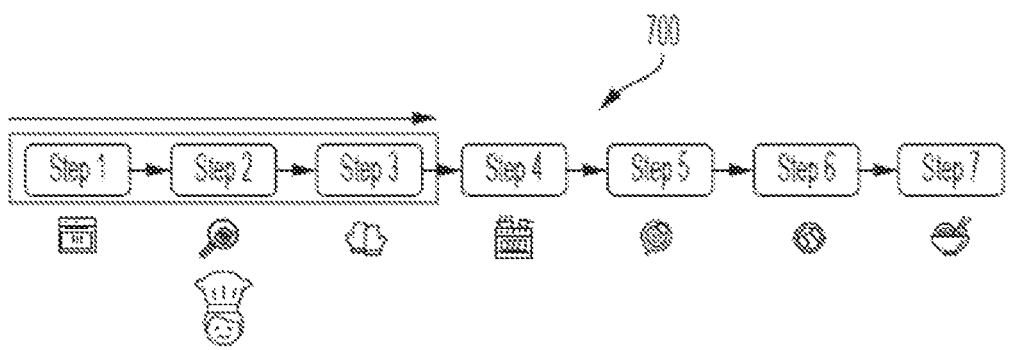
FIG. 7 is a flowchart of a method of task following using the event detection method according to an embodiment.

FIG. 7 is a flowchart of a method 700 of task following using the event detection method according to an embodiment. The embodiment of FIG. 7 discusses a task of cooking food using a cognitive augment reality-based assistant, but the disclose is not limited to this embodiment.

For many kinds of cognitive AR-based assistants that guide a user in performing a multi-step task, the events that activate a trigger (which can be textual instructions in this case) are sequentially ordered. When the step the user is on is known, the number of events of interest can be narrowed down to be within a tight window of instructions centered around the current step as shown in FIG. 7.

Having identified the current task state, suggestions can be provided for the next step. In such a setup, a user's progress through a task sequence can be automatically tracked to alleviate the need to say "next". For example, given a recipe of seven steps, an ordered set of seven events can be created. Because of temporal constraints, if the current step is step 2, it is unlikely that the user will directly jump to step 6 or step 7. Instead, the user may go back to the previous step (step 1) or the next step (step 3). In general, if the user is on step i, the video stream would only need to be matched against activities between (i−r, i+r) steps, where r is the number of additional steps to include in the system before and after the current task. Consequently, with a smaller set of triggers at any giver time, the ambiguity of detecting the step that the user is currently performing may be reduced.

The foregoing disclosure provides illustration and description but is not intended to be exhaustive or to limit the implementations to the precise form disclosed. Modifications and variations are possible in light, of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method of real-time video event detection comprising:
   obtaining, based on a natural language query, a query vector,
   performing multimodal feature extraction on a video stream to obtain a video vector,
   obtaining a similarity score by comparing the query vector to the video vector;
   comparing the similarity score to a predetermined threshold; and
   activating, based on the similarity score being above the predetermined threshold, an action trigger,
   wherein the performing of the multimodal feature extraction is performed using a plurality of overlapping windows that include sequential frames of the video stream,
   wherein the performing of the multimodal feature extraction comprises:
      obtaining a latency constraint for the performing of the multimodal feature extraction; and
      selecting a plurality of final feature extractors, among a plurality of predetermined feature extractors corresponding to a plurality of modalities, based on the latency constraint, predetermined performances of the plurality of predetermined feature extractors, and predetermined latencies of the plurality of predetermined feature extractors.

2. The method according to claim 1, wherein each of the plurality of overlapping windows begins at a same starting frame of the video stream.

3. The method according to claim 1, further comprising:
   obtaining a plurality of first sub-video vectors that correspond to the plurality of overlapping windows;
   obtaining a similarity score between each of the plurality of first sub-video vectors and the query vector; and
   selecting a first sub-video vector having a highest similarity score as the video vector.

4. The method according to claim 3, further comprising, in response to selection of the video vector, obtaining a plurality of second sub-video vectors that correspond to overlapping windows which begin at a frame following a last frame of a window corresponding to the first sub-video vector.

5. The method according to claim 1, wherein the selecting the plurality of final feature extractors comprises selecting only a single feature extractor from any of the plurality of modalities.

6. The method according to claim 1, wherein the performing of the multimodal feature extraction is performed by a deep learning based model, and
   the deep learning based model is trained based on training sets in which information provided by one randomly selected feature extractor is masked.

7. The method according to claim 1, further comprising:
   obtaining, based on a plurality of ordered natural language queries, a plurality of ordered query vectors;
   obtaining a plurality of similarity scores by comparing only a sequential portion of the plurality of ordered query vectors and the video vector; and
   activating, based on one of the plurality of similarity scores being above the predetermined threshold, the action trigger.

8. An apparatus for real-time video event detection, the apparatus comprising:
   a memory storing one or more instructions; and
   at least one processor configured to execute the one or more instructions to:
      obtain, based on a natural language query, a query vector;
      perform multimodal feature extraction on a video stream to obtain a video vector,
      obtain a similarity score by comparing the query vector to the video vector;
      compare the similarity score to a predetermined threshold; and
      activate, based on the similarity score being above the predetermined threshold, an action trigger,
   wherein the multimodal feature extraction is performed using a plurality of overlapping windows that include sequential frames of the video stream,
   wherein the at least one processor is further configured to execute the one or more instructions to:
      obtain a latency constraint for performing the multimodal feature extraction; and
      select a plurality of final feature extractors, among a plurality of predetermined feature extractors corresponding to a plurality of modalities, based on the latency constraint, predetermined performances of the plurality of predetermined feature extractors, and predetermined latencies of the plurality of predetermined feature extractors.

9. The apparatus according to claim 8, wherein each of the plurality of overlapping windows begins at a same starting frame of the video stream.

10. The apparatus according to claim 8, wherein the at least one processor is further configured to execute the one or more instructions to:
    obtain a plurality of first sub-video vectors that correspond to the plurality of overlapping windows;
    obtain a similarity score between each of the plurality of first sub-video vectors and the query vector; and
    select a first sub-video vector having a highest similarity score as the video vector.

11. The apparatus according to claim 10, wherein the at least one processor is further configured to execute the one or more instructions to obtain, in response to selection of the video vector, a plurality of second sub-video vectors that correspond to overlapping windows which begin at a frame following a last frame of a window corresponding to the first sub-video vector.

12. The apparatus according to claim 8, wherein the selecting the plurality of final feature extractors comprises selecting only a single feature extractor from any of the plurality of modalities.

13. The apparatus according to claim 8, wherein the multimodal feature extraction is performed by a deep learning based model, and
the deep learning based model is trained based on training sets in which information provided by one randomly selected feature extractor is masked.

14. The apparatus according to claim 8, wherein the at least one processor is further configured to execute the one or more instructions to:
obtain, based on a plurality of ordered natural language queries, a plurality of ordered query vectors;
obtain a plurality of similarity scores by comparing only a sequential portion of the plurality of ordered query vectors and the video vector; and
activate, based on one of the plurality of similarity scores being above the predetermined threshold, the action trigger.

15. A non-transitory computer-readable medium storing instructions, the instructions comprising: one or more instructions that, when executed by one or more processors, cause the one or more processors to:
obtain, based on a natural language query, a query vector;
perform multimodal feature extraction on a video stream to obtain a video vector,
obtain a similarity score by comparing the query vector to the video vector;
compare the similarity score to a predetermined threshold; and
activate, based on the similarity score being above the predetermined threshold, an action trigger,
wherein the multimodal feature extraction is performed using a plurality of overlapping windows that include sequential frames of the video stream,
wherein the instructions further cause the one or more processors to:
obtain a latency constraint for performing the multimodal feature extraction; and
select a plurality of final feature extractors, among a plurality of predetermined feature extractors corresponding to a plurality of modalities, based on the latency constraint, predetermined performances of the plurality of predetermined feature extractors, and predetermined latencies of the plurality of predetermined feature extractors,
and
wherein the selecting the plurality of final feature extractors comprises selecting only a single feature extractor from any of the plurality of modalities.

16. The non-transitory computer-readable medium of claim 15, wherein each of the plurality of overlapping windows begins at a same starting frame of the video stream, and wherein the instructions further cause the one or more processors to:
obtain a plurality of first sub-video vectors that correspond to the plurality of overlapping windows;
obtain a similarity score between each of the plurality of first sub-video vectors and the query vector;
select a first sub-video vector having a highest similarity score as the video vector; and
obtain, in response to selection of the video vector, a plurality of second sub-video vectors that correspond to overlapping windows which begin at a frame following a last frame of a window corresponding to the first sub-video vector.

17. The non-transitory computer-readable medium of claim 15, wherein the instructions further cause the one or more processors to:
obtain, based on a plurality of ordered natural language queries, a plurality of ordered query vectors;
obtain a plurality of similarity scores by comparing only a sequential portion of the plurality of ordered query vectors and the video vector; and
activate, based on one of the plurality of similarity scores being above the predetermined threshold, the action trigger.

* * * * *